United States Patent
Feng et al.

(10) Patent No.: US 7,703,963 B2
(45) Date of Patent: Apr. 27, 2010

(54) LIGHT GUIDING STRIP AND DOUBLE-SIDED PLANAR LIGHT APPARATUS

(75) Inventors: Yaojun Feng, Hong Kong (CN); Danding Huang, Hong Kong (CN); Kwan Wah Ng, Hong Kong (CN); Ying Liu, Hong Kong (CN); Shou-Lung Chen, Hong Kong (CN); Cheng Jung Tsai, Hong Kong (CN)

(73) Assignee: Hong Kong Applied Science and Technology Research Institute Co. Ltd., Hong Kong (CN)

( * ) Notice: Subject to any disclaimer, the term of this patent is extended or adjusted under 35 U.S.C. 154(b) by 32 days.

(21) Appl. No.: 12/238,020

(22) Filed: Sep. 25, 2008

(65) Prior Publication Data

US 2009/0073720 A1    Mar. 19, 2009

Related U.S. Application Data

(63) Continuation-in-part of application No. 11/901,122, filed on Sep. 14, 2007.

(51) Int. Cl.
*F21V 7/04* (2006.01)
(52) U.S. Cl. .................. 362/554; 362/613; 362/558; 349/65
(58) Field of Classification Search .............. 362/554, 362/558, 559, 613, 217; 349/61–69
See application file for complete search history.

(56) References Cited

U.S. PATENT DOCUMENTS

| | | | |
|---|---|---|---|
| 4,915,479 A * | 4/1990 | Clarke | 349/62 |
| 6,927,812 B2 * | 8/2005 | Cho | 349/65 |
| 6,966,644 B2 | 11/2005 | Jones et al. | |
| 6,986,598 B2 | 1/2006 | Chu et al. | |
| 7,347,605 B2 | 3/2008 | Higashiyama et al. | |
| 2003/0063456 A1 | 4/2003 | Katahira | |
| 2005/0007758 A1 | 1/2005 | Lee et al. | |
| 2005/0140848 A1 | 6/2005 | Yoo et al. | |
| 2007/0258267 A1 * | 11/2007 | Huang et al. | 362/616 |
| 2008/0084709 A1 * | 4/2008 | Li et al. | 362/616 |
| 2008/0130314 A1 | 6/2008 | Liu et al. | |

* cited by examiner

*Primary Examiner*—Ali Alavi
(74) *Attorney, Agent, or Firm*—Venable LLP; Jeffri A. Kaminski; Todd R. Farnsworth (57) ABSTRACT

A light guiding strip and a double-sided planar light apparatus are provided. According to one embodiment of the present invention, the double-sided planar light apparatus includes a plurality of light guiding strips, wherein the plurality of light guiding strips are positioned in a planar arrangement, each of the plurality of light guiding strips including a first plurality of light emitting surfaces disposed toward a first direction and a second plurality of light emitting surfaces disposed toward a second direction, each of the plurality of light guiding strips further including a first end and a second end configured to receive light, wherein the plurality of light guiding strips emit light from the first and second plurality of light emitting surfaces. Reflectors and light diffusion patterns on the light guiding strips provide control and independence over the two sides of the planar light apparatus.

19 Claims, 12 Drawing Sheets

LIGHT GUIDING STRIP AND DOUBLE-SIDED PLANAR LIGHT APPARATUS

CROSS-REFERENCE TO RELATED APPLICATIONS

This application is a continuation-in-part of U.S. patent application Ser. No. 11/901,122, filed on Sep. 14, 2007, the disclosure of which is incorporated fully by reference, which claims priority to foreign applications CN200610160820.2, filed Nov. 30, 2006, and CN200610168174.4, filed Dec. 15, 2006.

FIELD OF THE INVENTION

The present invention relates to a light guiding strip, and more particularly, to a double-sided planar light apparatus using one or more light guiding strips.

BACKGROUND OF THE INVENTION

Backlight modules are basic components in liquid crystal displays. Currently, many types of backlight modules are used. For example, in a conventional side-lit backlight module, LED are disposed on both sides of the backlight module, and a light guide plate is provided in the display area of the LCD display, and thus the light emitted by the LED at two ends of the backlight module can be uniformly irradiated out of the backlight module via the light guide plate. In a direct-lit backlight module, a plurality of LED are provided in the display area of the LCD display directly, so the light guide is not required. However, the half-power angle of the radiation of each LED is about. +−0.60 degrees. Therefore, in the direct-lit backlight module, a distance must be kept above the LED so as to allow the light emitted by two neighboring LED to be partially overlapping. The above two types of backlight modules have advantages and disadvantages, respectively. The side-lit backlight module employing the light guide plate is usually heavier than the direct-lit backlight module. However, the LED in the side-lit backlight module are arranged less densely than those in the direct-lit backlight module. Due to its long light-mixing distance, the direct-lit backlight module is relatively thick and also requires an additional circuit board. Therefore, the cost of the overall structure of the direct-lit backlight module is higher.

US Patent Publication Nos. 2005/0007758A1, 2005/0140848A1 and U.S. Pat. No. 6,966,644 provide backlight modules with increased LED pitch. Firstly, US Patent Publication No. 2005/0007758A1 provides a strip-shaped light guide with a plurality of openings, and an LED is disposed at two ends of the light guide respectively. When the LED emit light, a plurality of openings of the light guide will radiate light to simulate a plurality of LED. Further, US Patent Publication No. 2005/0140548A1 provides a backlight module with a plurality of strip-shaped light guides, which is advantageous in that the brightness of the backlight module can be adjusted by individually driving the selected light guide. Moreover, U.S. Pat. No. 6,966,664 provides a light guiding strip, in which the light emitted by LED at two ends of the light guiding strip is concentratedly irradiated out from an arced surface of the light guiding strip, so as to form a linear and uniform light source.

Therefore, existing light guiding strip and backlight modules have these and other limitations. Accordingly, there is a need for a backlight module and double-sided planar light apparatus that solves these and other shortcomings of existing lighting devices.

SUMMARY OF THE INVENTION

According to one embodiment of the present invention, a double-sided planar light apparatus is disclosed. The double-sided planar light apparatus includes a plurality of light guiding strips, wherein the plurality of light guiding strips are positioned in a planar arrangement, each of the plurality of light guiding strips including a first plurality of light emitting surfaces disposed toward a first direction and a second plurality of light emitting surfaces disposed toward a second direction, each of the plurality of light guiding strips further including a first end and a second end configured to receive light, wherein the plurality of light guiding strips are configured to emit light from the first and second plurality of light emitting surfaces.

According to another embodiment of the present invention, a double-sided planar light apparatus is disclosed. The double-sided planar light apparatus includes a first plurality of light guiding strips positioned in a planar arrangement, each of the plurality of light guiding strips including a first plurality of light emitting surfaces disposed toward a first direction and a second plurality of light emitting surfaces disposed toward a second direction, wherein at least one of the first plurality of light emitting surfaces of each of the first plurality of light guiding strips includes a light diffusion pattern, and wherein each of the first plurality of light guiding strips includes an end configured to receive light; and a second plurality of light guiding strips, each of the second plurality of light guiding strips including a first plurality of light emitting surfaces disposed toward a first direction and a second plurality of light emitting surfaces disposed toward a second direction, wherein the second plurality of light guiding strips is alternately interspersed with the first plurality of light guiding strips, each of the second plurality of light guiding strips adjacent to one of the first plurality of light guiding strips, and wherein at least one of the second plurality of light emitting surfaces of each of the second plurality of light guiding strips includes a light diffusion pattern, wherein each of the first plurality of light guiding strips includes an end configured to receive light.

According to another embodiment of the present invention, a double-sided planar light apparatus is disclosed. The double-sided planar light apparatus includes a first plurality of light guiding strips, each of the first plurality of light guiding strips including a first plurality of light emitting surfaces disposed toward a first direction and a second plurality of light emitting surfaces disposed toward a second direction, wherein at least one of the first plurality of light emitting surfaces of each of the first plurality of light guiding strips includes a light diffusion pattern, and wherein each of the first plurality of light guiding strips includes at least one end configured to receive light; a second plurality of light guiding strips, each of the second plurality of light guiding strips including a first plurality of light emitting surfaces disposed toward a first direction and a second plurality of light emitting surfaces disposed toward a second direction, wherein the second plurality of light guiding strips is alternately interspersed with the first plurality of light guiding strips, each of the second plurality of light guiding strips adjacent to one of the first plurality of light guiding strips, and wherein at least one of the first plurality of light emitting surfaces of each of the second plurality of light guiding strips includes a light diffusion pattern, and wherein each of the first plurality of light guiding strips includes at least one end configured to receive light; one or more LED positioned proximate to each of the at least one end of each of the first and second plurality of light guiding strips; and one or more reflectors, the one or more reflectors configured such that the reflector is adjacent to the first plurality of light emitting surfaces of the first plurality of light guiding strips and further adjacent to the second plurality of light emitting surfaces of the second plurality of light guiding strips.

Still other embodiments of the present invention will become readily apparent to those skilled in the art from the following detailed description, wherein embodiments of the invention are described by way of illustration. As will be realized, the invention is capable of other and different embodiments and its several details are capable of modifications in various respects, without departing from the spirit and the scope of the present invention.

DETAILED DESCRIPTION

In the following description, reference is made to the accompanying drawings where, by way of illustration, specific embodiments of the invention are shown. It is to be understood that other embodiments may be used as structural and other changes may be made without departing from the scope of the present invention. Also, the various embodiments and aspects from each of the various embodiments may be used in any suitable combinations. Accordingly, the drawings and detailed description are to be regarded as illustrative in nature and not as restrictive.

The present invention provides a light guiding strip that possesses both side-lit and direct-lit characteristics. The light guiding strip is applicable to a backlight module of a display. Embodiments of the present invention are also directed to a lighting system and a planar light apparatus.

Figure 1A:
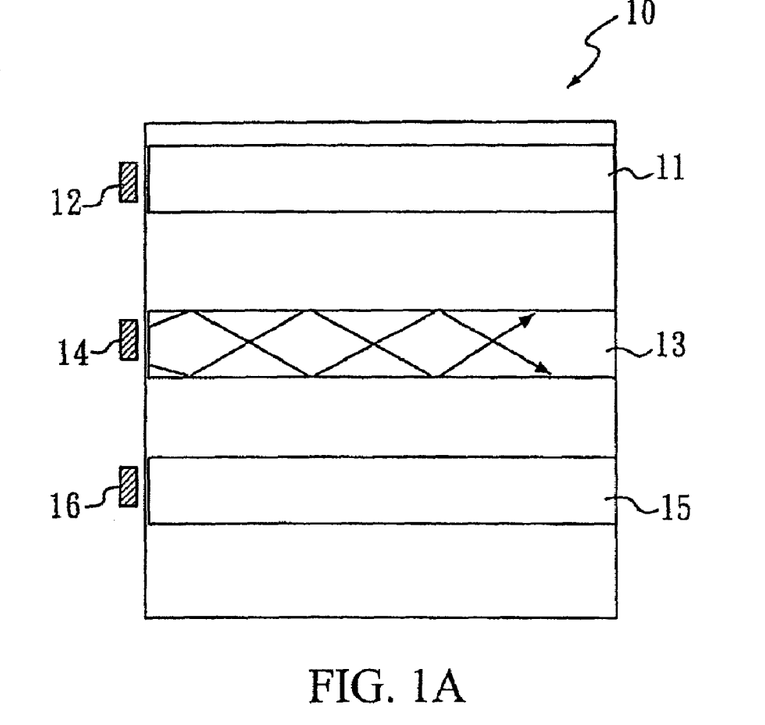
FIG. 1A is a top view of the backlight module that possesses both the side-lit and the direct-lit characteristics of the present invention.
Figure 1B:
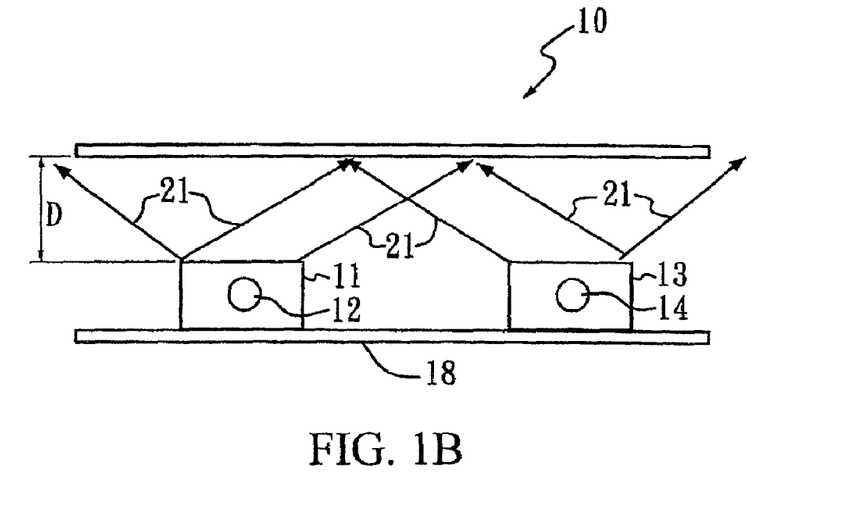
FIG. 1B is a side view of the backlight module that possesses both the side-lit and the direct-lit characteristics of the present invention.

FIGS. 1A and 1B are a top view and a side view of a backlight module 10 that possesses both the side-lit and the direct-lit characteristics. As shown in FIG. 1A, the backlight module 10 includes a plurality of light guiding strips 11, 13, and 15 disposed on a substrate 18, and an LED 12, 14, and 16 is disposed on at least one end of each of the light guiding strips 11, 13, and 15, respectively. As shown in FIG. 1B, the light generated by the LED 12, 14, and 16 will enter the light guiding strips 11, 13, and 15, and a part of the light 21 will come out from the upper surfaces of the light guiding strips 11, 13, and 15 to the first optical layer. According to the innovative characteristics of the light guiding strip of the present invention, a uniform light output and a larger light mixing area is achieved, so the LED pitch can be increased. Moreover, unlike the side-lit backlight module, the backlight module 10 may not include a light guide plate, so the weight and cost of the backlight module can be reduced greatly.

Figure 2:
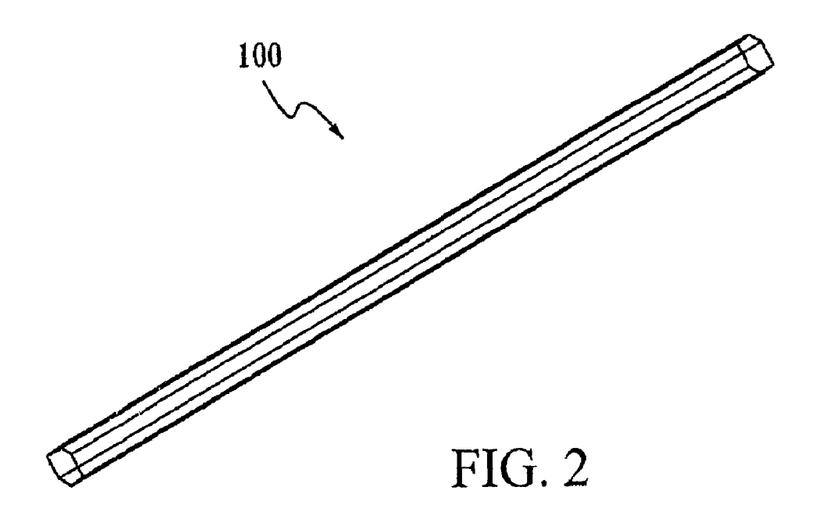
FIG. 2 is a schematic view of the light guiding strip according to an embodiment of the present invention.
Figure 3:
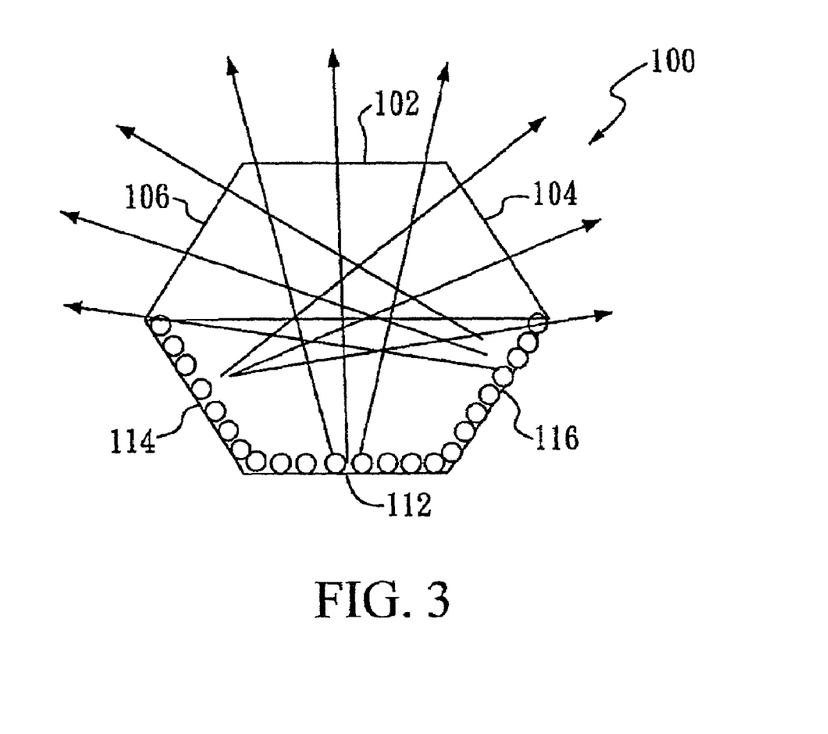
FIG. 3 is a cross sectional view of the light guiding strip of FIG. 2, according to an embodiment of the present invention.

FIG. 2 is a schematic view of a light guiding strip 100 according to an embodiment of the present invention, and FIG. 3 is a cross sectional view of the light guiding strip 100. As shown in FIG. 3, the light guiding strip 100 includes a plurality of light emergent surfaces 102, 104, and 106, and a plurality of light-reflecting surfaces 112, 114, and 116. In this embodiment, the cross section of the light guiding strip 100 is hexagonal, and each side of the hexagon corresponds to a light emergent surface or a light reflecting surface. As shown in FIG. 2, light diffusion patterns having a light diffusion function are disposed on the light-reflecting surfaces 112, 114, and 116. In this embodiment, the light diffusion patterns are a plurality of small bumps or dots with a diameter of about 0.05-2 mm, and preferably about 0.2-0.3 mm. The light emergent surfaces 102, 104, and 106 will reflect light at specific angles and refract part of the light coming from the light diffusion patterns. As the small bumps that form the light diffusion patterns will change the total reflection conditions, the light incident on the light guiding strip 100 from the LED will be diffused, and the propagating direction of the light will be changed. Therefore, the small bumps allow the light to be refracted and come out from the light emergent surfaces 102, 104, and 106 easily with a certain energy distribution rule, so as to improve the light emitting efficiency and uniformity of the light guiding strip 100.

In this embodiment, the light diffusion patterns are not limited to be implemented as small bumps or dots. For example, the light diffusion patterns can also be a plurality of small pits with a diameter of about 0.05-2 mm or V-grooves with a pitch of about 0.05-2 mm. The diameter of the small pits is preferably about 0.2-0.3 mm, and the pitch between the V-grooves is about 0.2-0.3 mm. The bumps and pits can be formed on the light guiding strip 100 by means of porous printing and/or injection molding. The light diffusion patterns may also be applied in the form of ink or printing applied to the surface of the light guiding strip 100. However, it is apparent to persons of ordinary skill in the art that other methods of forming the bumps and pits can be used, and the details will not be described herein.

Moreover, the light guiding strip 100 of this embodiment has three light emergent surfaces 102, 104, and 106, and each of the light emergent surfaces 102, 104, and 106 corresponds to a light-reflecting surface. Therefore, the light quantity irradiated from each of the light emergent surfaces 102, 104, and 106 is uniform. Moreover, it is seen from FIG. 3 that the angle of the light that the light guiding strip 100 can irradiate is far greater than the half-power angle of the conventional LED (about. +−0.60 degrees) or the angle of the light that the conventional light guiding strip can irradiate. Thus, the backlight module using the light guiding strip 100 of this embodiment has a thinner light-mixing area compared with the conventional direct-lit illumination, so the thickness of the backlight module and the display is reduced effectively. In addition, according to another embodiment of the present invention, the light emergent surfaces 102, 104, and 106 can be smooth surfaces, roughened surfaces, or surfaces with specific micro structures. However, such surface treatment methods are known to persons of ordinary skill in the art, and thus will not be described herein.

Figure 4:
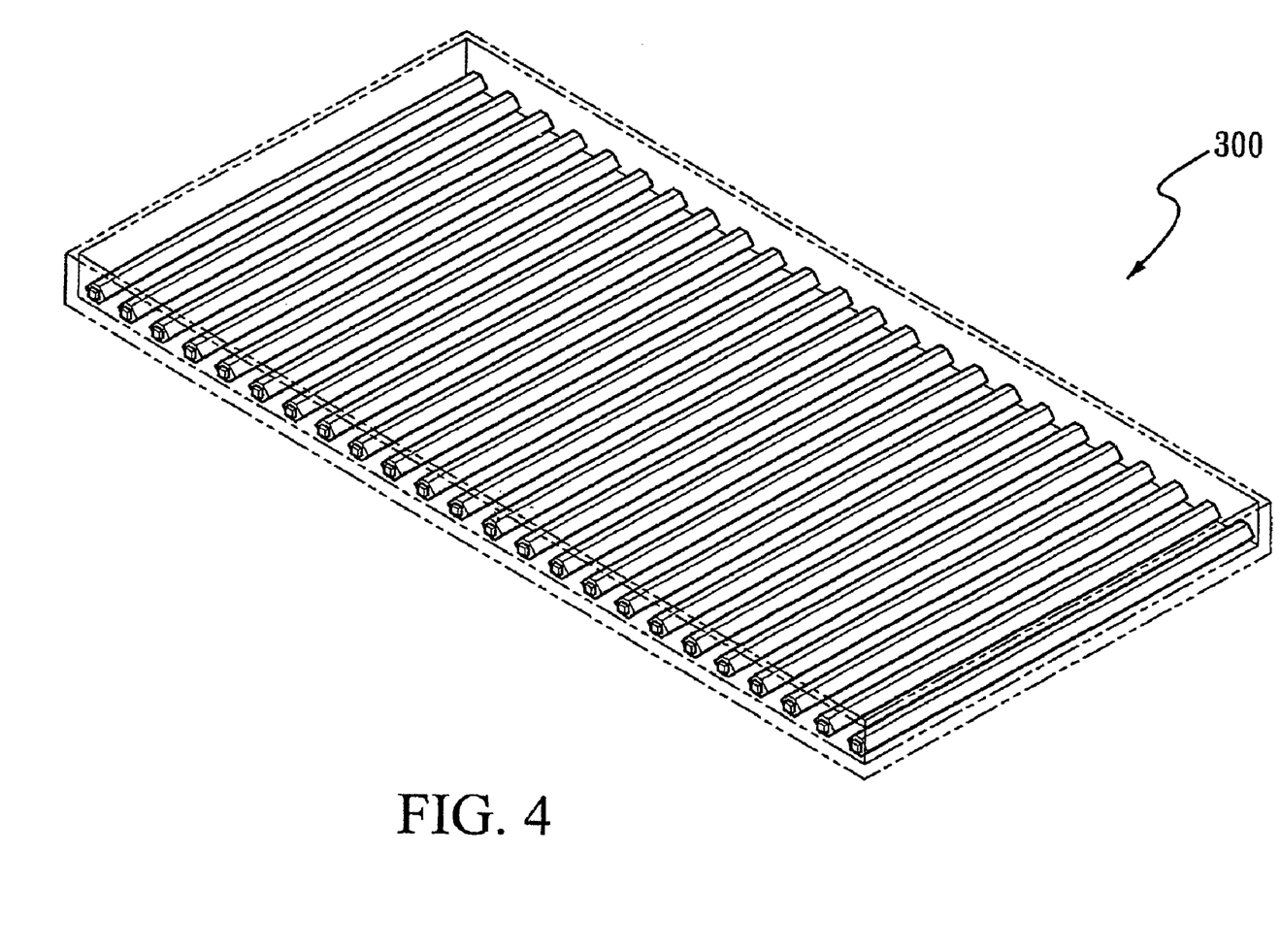
FIG. 4 is a schematic view of the backlight module having a plurality of the light guiding strip of FIG. 2, according to an embodiment of the present invention.

FIG. 4 is a schematic view of a backlight module 200 using the light guiding strip of FIG. 2 according to an embodiment of the present invention. As shown in FIG. 4, a plurality of light guiding strips is arranged on a substrate in juxtaposition or in parallel. When the LED at any end (or both ends) of each of the light guiding strips emit light, each of the light guiding strips will also emit light, and a light-mixing area formed by mixing the light irradiated from the light guiding strips will provide a uniform area light source. Though the above embodiment mainly describes the light guiding strips and the backlight module, the display using the light guiding strips and the backlight module also falls into the scope of the claims of the present invention.

Figure 5:
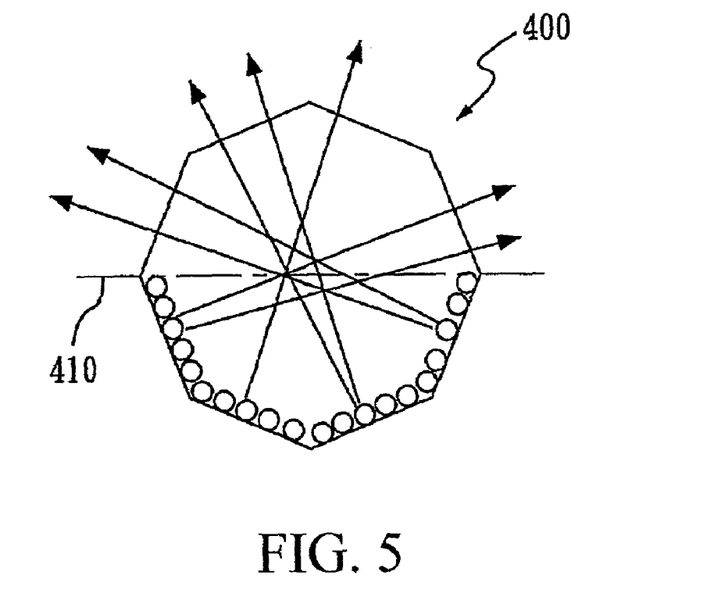
FIG. 5 is a cross sectional view of the light guiding strip, according to another embodiment of the present invention.

FIG. 5 is a cross sectional view of a light guiding strip 400 according to another preferred embodiment of the present invention. Referring to FIG. 5, the cross section of the light guiding strip 400 is octagonal, and each side of the octagon corresponds to a light emergent surface or a light-reflecting surface having a light diffusion pattern. Moreover, a line 410 passing through the center of the octagon divides the eight sides into an upper part and a lower part, in which the upper part and the lower part have four sides, respectively. The sides of the upper part completely correspond to the light emergent surfaces, and the sides of the lower part completely correspond to the light-reflecting surfaces. In other words, the plurality of light emergent surfaces is arranged in a cluster, and the plurality of light reflecting surfaces is also arranged in a cluster. Thus, though the light guiding strip with a hexagonal or octagonal cross section is illustrated in the above embodiments, persons of ordinary skill in the art can easily derive the fact that the cross section of the light guiding strip of other preferred embodiments of the present invention can be a polygon with four or more sides, or a polygon with four or more even-numbered sides, for example, decagonal. Furthermore, if the cross section of the light guiding strip has N sides, then the light guiding strip has N/2 light emergent surfaces arranged in a cluster and N/2 light reflecting surfaces arranged in a cluster.

Figure 6:
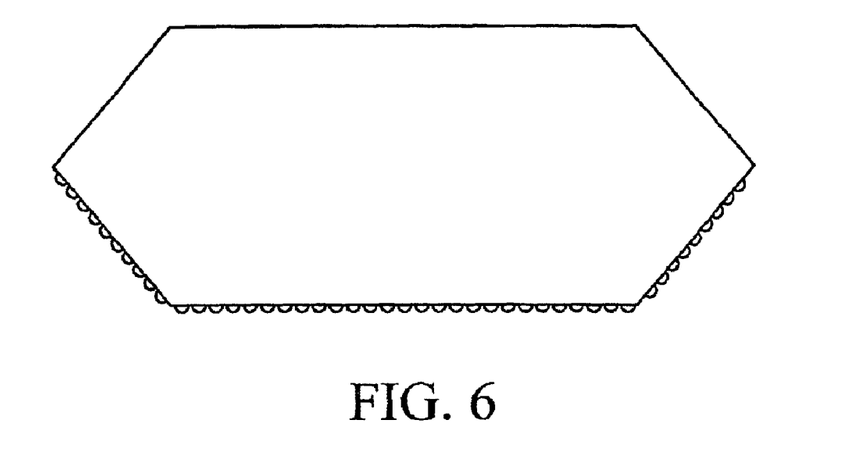
FIG. 6 is a cross sectional view of the light guiding strip, according to another embodiment of the present invention.

It should be noted that according to other embodiments of the present invention, the cross section of the light guiding strip is not limited to a regular polygon. For example, the cross section of the light guiding strip according to an embodiment of the present invention can also be the one shown in FIG. 6. Moreover, the cross section of the light guiding strip can also be a polygon with an odd number of sides, for example, a heptagon, with four light emergent surfaces arranged in a cluster and three light-reflecting surfaces arranged in a cluster, or with three light emergent surfaces arranged in a cluster and four light-reflecting surfaces arranged in a cluster. The light guiding strip must have at least two light-reflecting surfaces and at least two corresponding light emergent surfaces, so as to expand the angle that the light guiding strip can irradiate the light. To sum up, the backlight module or display using the light guiding strip provided by the present invention at least has the following advantages. Firstly, as compared with the side-lit, the backlight module or display using the light guiding strip of the present invention does not need the light guide, so the weight of the backlight module is reduced. Then, the backlight module or display using the light guiding strip of the present invention can effectively increase the LED pitch, thus saving costs. Further, compared to the direct-lit type, the backlight module and display using the light guiding strip of the present invention can reduce the thickness of the backlight module. Moreover, the backlight module and display using the light guiding strip of the present invention do not need the light guide and additional circuit boards, so the cost of the overall structure is reduced greatly.

Generally, FIGS. 7 through 15 are directed to embodiments of a double-sided backlight module incorporating the light guiding strips described with reference to FIGS. 1 to 6. The double-sided backlight module emits light in two generally different directions, and is especially suitable for a two-sided display screen or other lighted device. While embodiments of the invention described with reference to FIGS. 1 to 6 may be used for in conjunction with a double-sided backlight module and display, embodiments described with reference to FIGS. 7 to 15 provide additional features and functionality. Descriptions provided with reference FIGS. 1 to 6 similarly apply to the embodiments described with reference to FIGS. 7 to 15, unless otherwise stated. Similarly, descriptions provided with reference to FIGS. 7 to 15 may also apply to the embodiments described with reference to FIGS. 1 to 6 where suitable. While the embodiments illustrated and described generally relate to a backlight module, the backlight module is only one example of a planar light apparatus that embodies the present invention. Accordingly, embodiments of the present invention are not limited to use as a backlight but may be used as other planar light apparatus.

Figure 7:
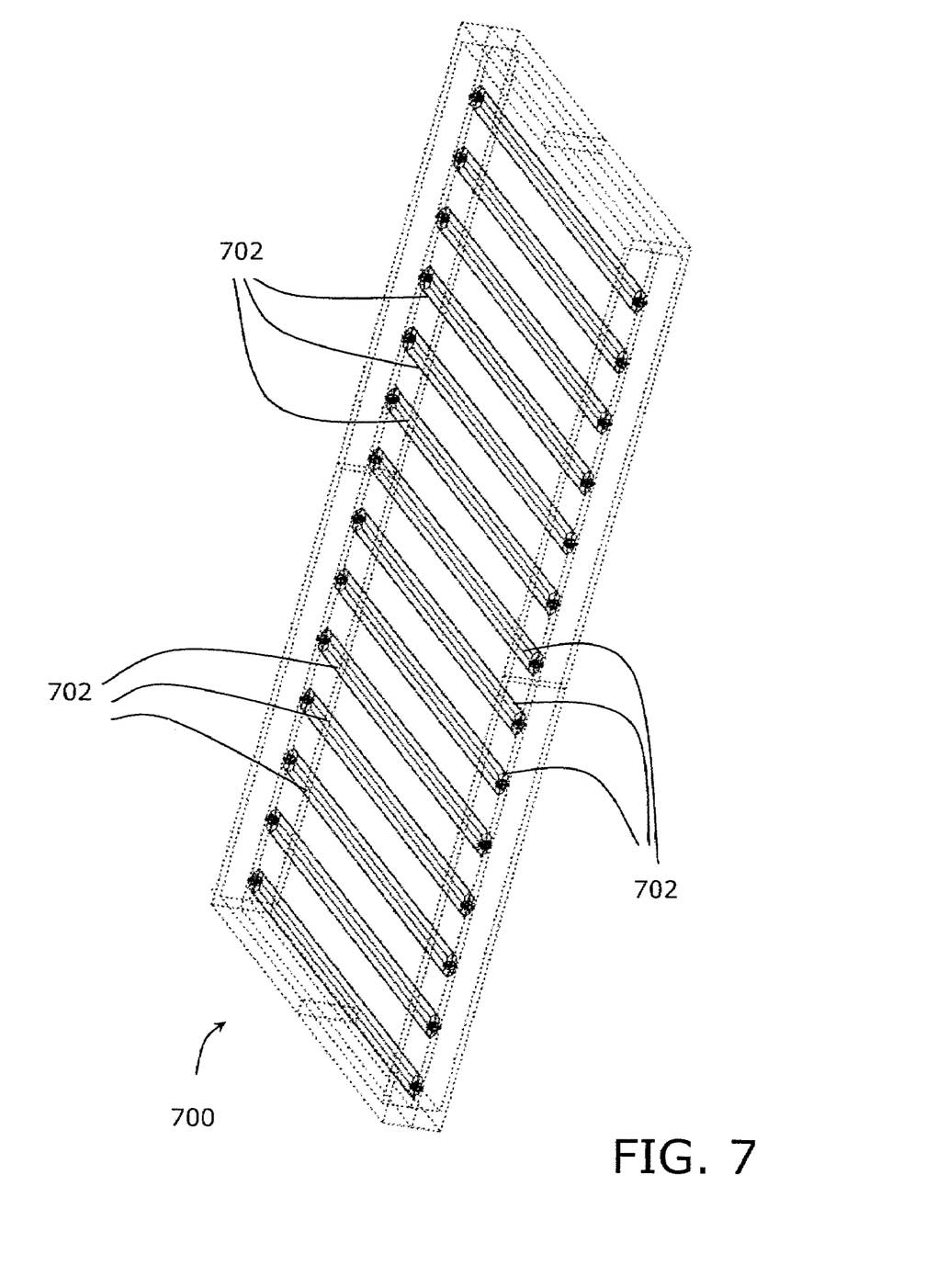
FIG. 7 is a schematic view of a backlight module, according to another embodiment of the present invention.

FIG. 7 is a schematic view of a backlight module 700, according to another embodiment of the present invention. The backlight module 700 has a generally planar shape with a plurality of light guiding strips 702 extending laterally across the backlight module. As illustrated, each of the plurality of light guiding strips 702 is generally positioned in a planar arrangement within the backlight module. This positioning is a variation from the illustration of FIG. 1B, where each of the light guiding strips 11, 13 are disposed on a substrate. However, the light guiding strips may also be disposed on a substrate or otherwise positioned as required. Each of the plurality of light guiding strips 702 shown in FIG. 7 are generally positioned such that the sides of the light guiding strips 702 are not obstructed and light is permitted to emit through all sides of the light guiding strips 702.

According to one embodiment, each of the plurality of light guiding strips 702 is positioned using one or more frames with a recess configured to receive an end of the light guiding strip 702. The recess may be positioned generally within the center of the frame such that, when the frame is located in the backlight module 700 or a display device, the plurality of light guiding strips 702 is suspended and generally disposed away from any surface. The frame may include an LED, or other light, such that, when the frame engages the end of the light guiding strip 702, the LED is proximate to the end of the light guiding strip 702 and when on, light from the LED will be directed into the light guiding strip 702 at the end of the light guiding strip 702. Each end of the light guiding strip 702 may be a light input surface of the light guiding strip 702.

According to one embodiment, the light guiding strip 702 is a generally solid strip made from a plastic or polymer material. According to one embodiment, the light guiding strip 702 may be formed from an acrylic rod. However, rods formed with any other suitable materials may also be used. When light is applied or directed to the end of the light guiding strip 702, light travels through the light guiding strip 702, also permeating through the surface of the light guiding strip 702, and thereby emitting light through the surfaces of the light guiding strip. As also described with reference to FIG. 2, surfaces of the light guiding strip 702 may have light diffusion patterns to diffuse and reflect light according to the desired application. According to one embodiment of the invention, the light diffusion patterns may disrupt the total internal reflection of light in the light guiding strips. Therefore, the light diffusing patterns may increase the amount of light diffusion, interfere with the internal reflection of light, and thereby result in light being emitted from the light guiding strips. These patterns may be applied to the light guiding strip 702 during production or subsequent to the manufacturing of the light guiding strip 702. The patterns may be formed with dots, holes, pits, notches, divots, impressions or any shape of depression formed into the light guiding strip 702. These depressions may be arranged in any pattern at the surface of light guiding strip. The patterns may also be formed with a plurality of protrusions extending out from the light guiding strip 702. For example, as described with reference to FIG. 2, small bumps or dots may be formed on the surface of the light guiding strip 702. However, any shape protrusion may be used. Also, there may be a combination of depressions and protrusions used, either separate from each other or joining, to form any desired patterns. Also, the depressions and protrusions may be formed in the shape of lines in any desired configurations and combinations.

Figure 8:
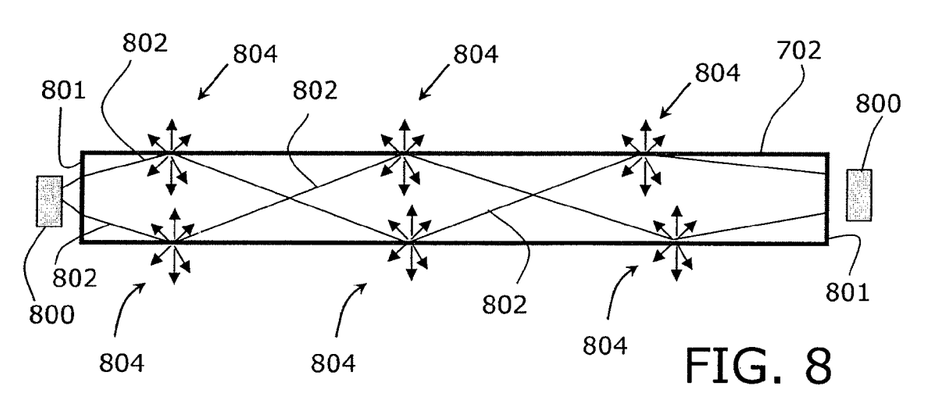
FIG. 8 is a side view of the light guiding strip shown in FIG. 7, according to one embodiment of the present invention.

FIG. 8 is a side view of the light guiding strip shown in FIG. 7, according to one embodiment of the present invention. Two LED 800 are shown, one at each end of the light guiding strip 702. However, embodiments of the present invention may use one or two LED 800 for each light guiding strip 702, or any suitable number considering the application. Also, two or more LED may be used as light input at an end of the light guiding strip 702. Each end of the light guiding strip 702 is a light input surface 801. Light reflection lines 802 are used to illustrate the travel path of light within the light guiding strip 702. Light rays 804 are used to illustrate both the emitting of light from the light guiding strip 702 as well as the reflection of light within the light guiding strip 702.

Figure 9:
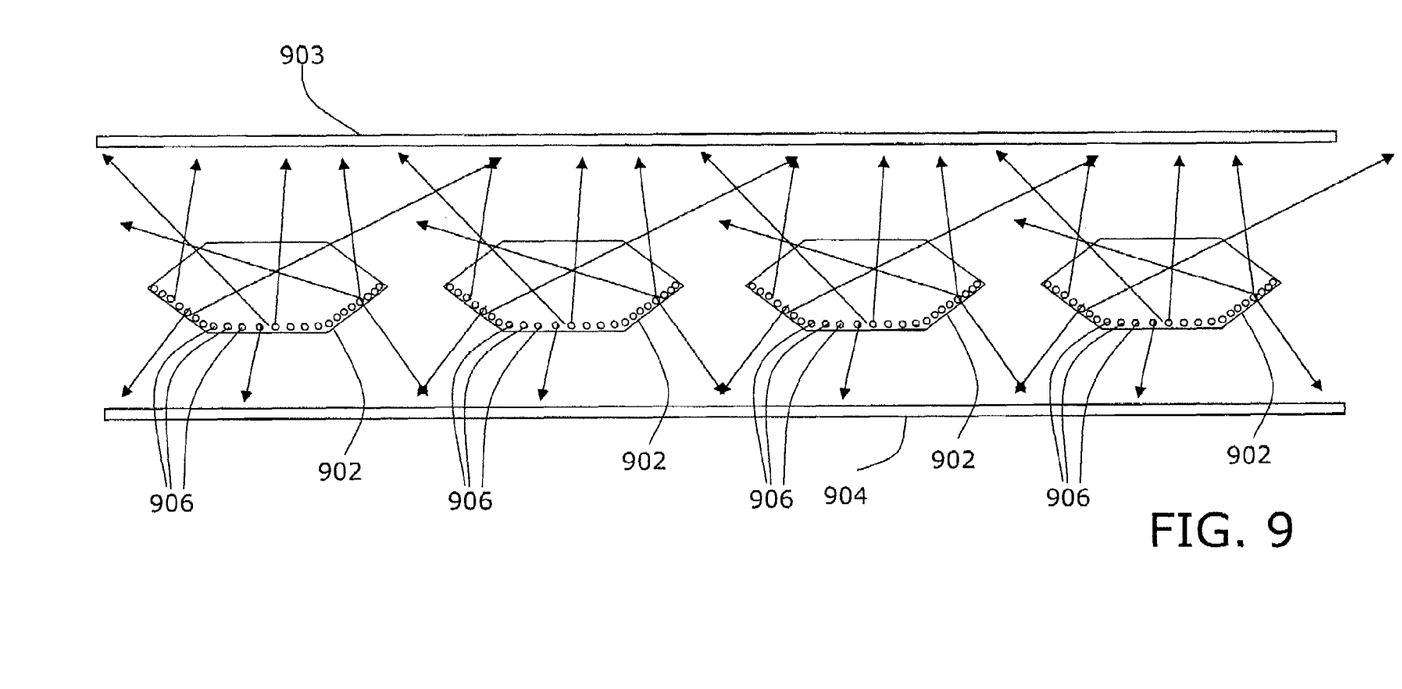
FIG. 9 is a partial, cross-sectional end view of the backlight module shown in FIG. 7, according to one embodiment of the present invention.

FIG. 9 is a partial, cross-sectional end view of the backlight module shown in FIG. 7, according to one embodiment of the present invention. A plurality of light guiding strips 902 are seen between a first optical layer 903 and a second optical layer 904. The first optical layer 903 is positioned in a first direction relative to the plurality of light guiding strips 902. The second optical layer 904 is positioned in a second direction relative to the plurality of light guiding strips 904. The first optical layer 903 and the second optical layer 904 are included for illustration purposes. In application, each light guiding strips 902 in a backlight module will be overlaid with one or more layers of material, such as an optical film, liquid crystal layers, a display panel, or some other surface. Such adjacent layer will be generally planar and proximate to the light guiding strips 902. The light guiding strips 902 are shown generally distant from the first optical layer 903 and the second optical layer 904, as light will be emitted in both a first direction, which is illustrated as the direction of the first optical layer 903, and in a second direction, which is illustrated as the direction of the second optical layer 904. According to one embodiment, the light guiding strips 902 are generally equidistant from both the first optical later 903 and the second optical layer 904. However, embodiments may also not use such equal distancing.

The light diffusion patterns of the light guiding strip 902 are illustrated with a plurality of circular dots 906 on the lower three sides of the hexagonal shaped cross section. While these circular dots 906 have a particular shape, size, number and positioning, it is to be understood that these circular dots 906 are included for the purpose of illustration and the light diffusion patterns are not limited to the size, shape, number, and positioning shown in the figures. Instead, the light diffusion patterns may have any suitable configuration as described above. Also, while the circular dots 906 are also shown located below the surface of the light guiding strip 902, these circular dots 906 are included for the purposes of illustration, and as described above, the patterns may be formed as depressions or protrusions.

A plurality of arrow-ended lines is used to illustrate the light waves being emitted from the light guiding strip 902. With reference to FIGS. 1 to 6, the sides without the circular dots 906 are referred to as the light emergent surfaces and the sides having the circular dots 906 are referred to as the light reflecting surfaces. The light reflecting surfaces do not necessarily reflect all of the light internally, and additionally emit and diffuse light. Therefore, the light reflecting surfaces may also be referred to herein as "light diffusing surfaces" or "light emitting surfaces." The light emergent surfaces emit light and may also be referred to herein as "light emitting surfaces." As the light emitting surfaces are generally unobstructed by any depressions or protrusions, the light emitting surface may emit a greater amount of light than the light diffusing surfaces. This is illustrated in FIG. 9 by a greater number of arrow-ended lines extending through the light emitting surfaces than there are extending through the light reflecting surfaces. As illustrated in FIG. 9, the top half of the light guiding strips 902 may emit more light than the lower half of the light guiding strips, and therefore, the planar light apparatus will be brighter in the direction of the first optical layer 903 and less bright in the direction of the second optical layer 904. Accordingly, the configuration illustrated in FIG. 9 provides an asymmetrical backlight configuration.

Generally, each of the plurality of light guiding strips 902 shown in FIG. 9 have three light emitting surfaces that are facing or generally disposed toward the first optical layer 903, disposed toward the first direction. While two of the light emitting surfaces are disposed toward the first direction at an angle, they remain disposed toward the first direction. Each of the plurality of light guiding strips 902 also has three light emitting surfaces, shown with a plurality of circular dots 906 indicating that they are also light diffusing surfaces that are facing or generally disposed toward the second optical layer 904, disposed toward the second direction. While two of the light diffusing surfaces are disposed toward the second direction at an angle, they remain disposed toward the second direction.

Figure 10:
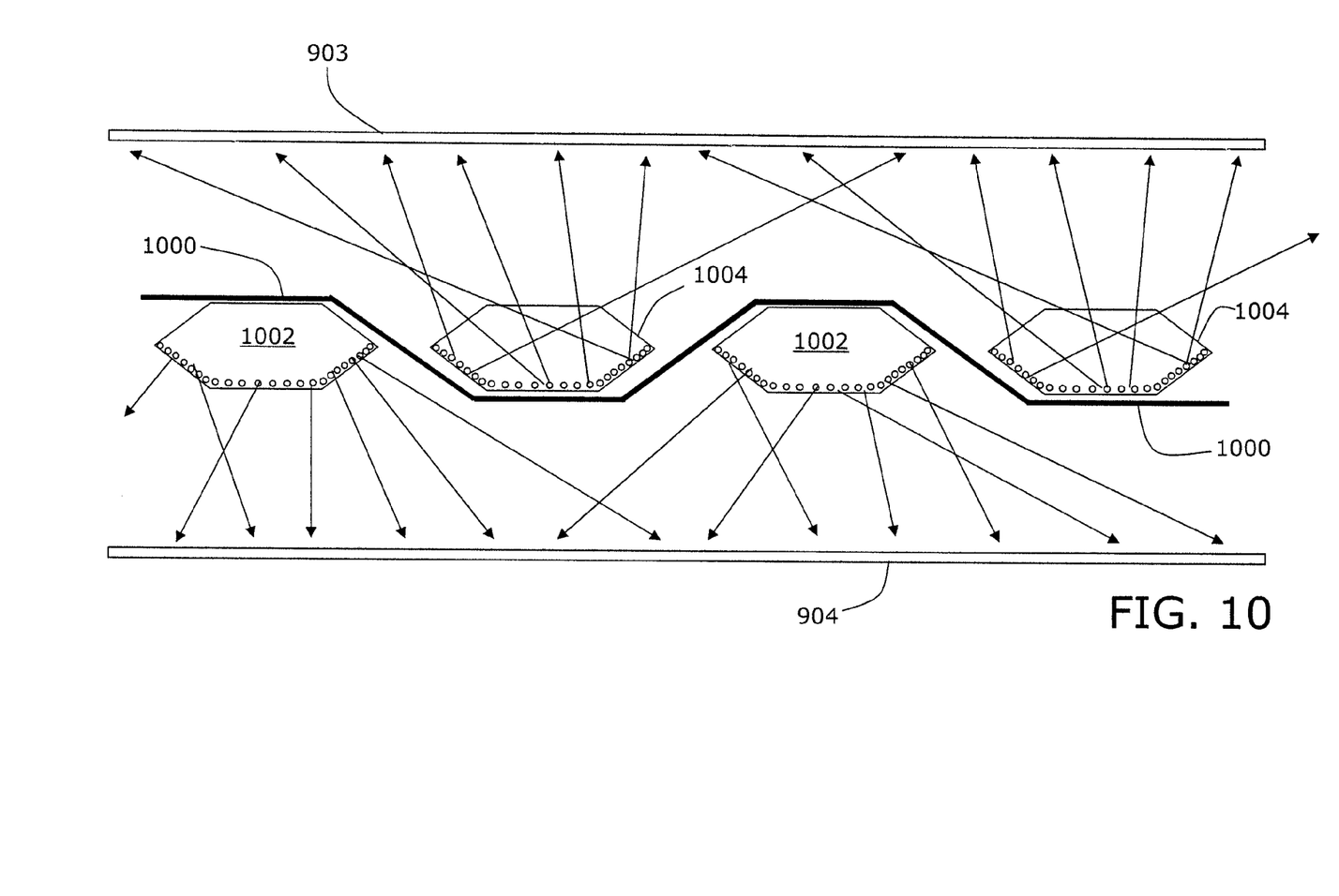
FIG. 10 is a partial, cross-sectional end view of the backlight module shown in FIG. 9, with a reflector, according to one embodiment of the present invention.

FIG. 10 is a partial, cross-sectional end view of the backlight module shown in FIG. 9, with a reflector, according to one embodiment of the present invention. Similar to the illustrated embodiment of FIG. 9, the embodiment illustrated in FIG. 10 includes the plurality of light guiding strips 1002, 1004, the first optical layer 903, the second optical layer 904, and the light diffusion pattern illustrated by the plurality of circular dots 906 on the lower three sides of the hexagonal shaped cross section. A reflector 1000 is also included in the backlight module. The reflector 1000 is illustrated having a generally corrugated shape, having alternating ridges, and is alternately interwoven through the light guiding strips 902 such that the reflector 1000 is positioned on the same side of every other light guiding strip 902. The reflector 1000 functions to divide the light guiding strips into two groups, a first plurality of light guiding strips 1002, or upper light guiding strips, and a second plurality of light guiding strips 1004, or lower light guiding strips. Due to the reflector 1000, the light emitted from the upper light guiding strips 1002 has a lesser effect, or no effect, on the amount of light emitted in the direction of the second optical layer 904. Similarly, the light emitted from the lower guiding strips 1004 has a lesser effect, or no effect, on the amount of light emitted in the direction of the first optical layer 903. Therefore, the LED corresponding to the upper light guiding strips 1002 can be controlled independently from the LED corresponding to the lower light guiding strips 1004, and the brightness in two directions can be controlled independently, limiting or reducing the amount of interference between the two different directions.

While the reflector shown in FIG. 10, and other figures, is illustrated as a single, continuous reflector alternately interwoven around the light guiding strips, the reflector may be a plurality of reflector strips, each of the reflector strips generally elongated and having a shape complementary to the shape of the light guiding strip 902 such that the reflector overlays the adjacent surfaces of the light guiding strip. A separate reflector strip may be located adjacent or proximate to each of the plurality of light guiding strips that, according to the illustrated embodiments, has a reflector strip.

Figure 11:
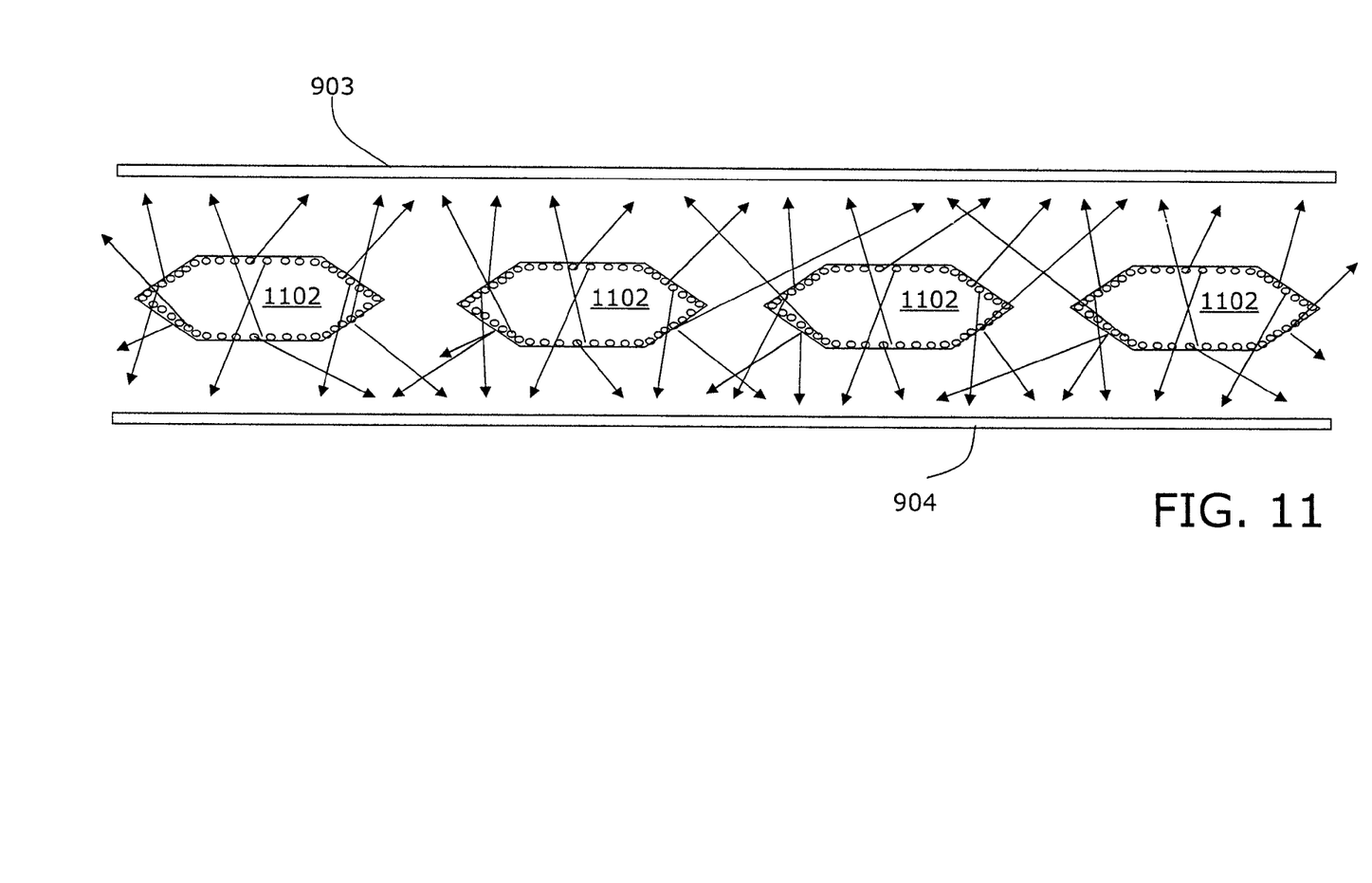
FIG. 11 is a partial, cross-sectional end view of the backlight module shown in FIG. 7, according to another embodiment of the present invention.

FIG. 11 is a partial, cross-sectional end view of the backlight module shown in FIG. 7, according to another embodiment of the present invention. Similar to the illustrated embodiment of FIG. 9, the embodiment illustrated in FIG. 11 includes a plurality of light guiding strips 1102, the first optical layer 903, and the second optical layer 904. The embodiment illustrated in FIG. 11 also includes light diffusion patterns, illustrated by the plurality of circular dots 906, on both upper and lower sides of the light guiding strip 1102. In one embodiment, all of the upper and lower sides need not have light diffusion patterns, but one of more the upper sides may have a light diffusion pattern and one or more of the lower sides may have a light diffusion pattern. According to another embodiment, the one or more upper sides may oppose the one or more lower sides of the light guiding strip 1102.

Figure 12:
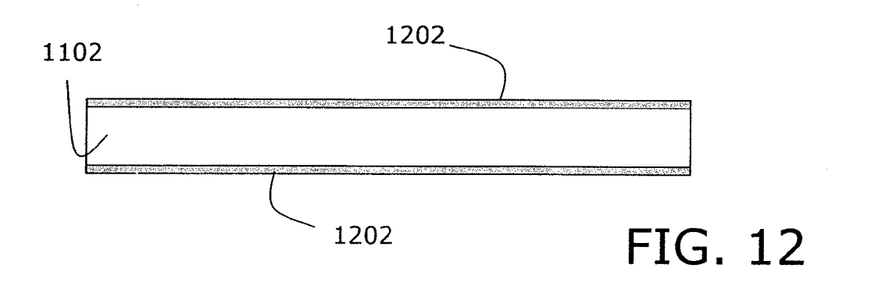
FIG. 12 is a side, cross sectional view of a light diffusion pattern of a light guiding strip, according to one embodiment of the present invention.
Figure 13:
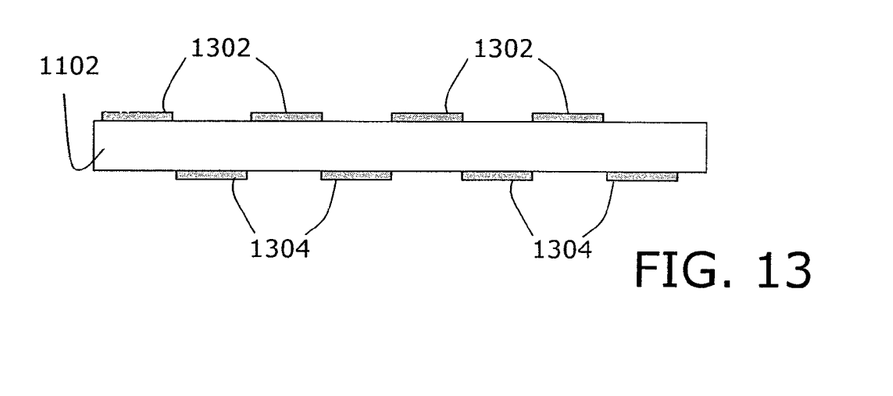
FIG. 13 is a side, cross sectional view of a staggered light diffusion pattern of a light guiding strip, according to one embodiment of the present invention.

FIGS. 12 and 13 are illustrations of light diffusion patterns, according to embodiments of the present invention. The light diffusion patterns of FIGS. 12 and 13 are described in conjunction with the embodiment shown and described with reference to FIG. 11. However, such variations in light diffusion pattern may be similarly incorporated into other embodiments.

FIG. 12 is a side, cross sectional view of a light diffusion pattern of a light guiding strip, according to one embodiment of the present invention. The light diffusion pattern 1202 runs along substantially the entire length of the light guiding strip 1102 on both the top and bottom of the light guiding strip 1102. While only the top and bottom of the light guiding strip 1102 are shown with light diffusion patterns 1202, the light diffusion pattern 1202 may also run along substantially the entire length of all sides of the light guiding strip 1102, including the top and bottom.

FIG. 13 is a side, cross sectional view of a staggered light diffusion pattern of a light guiding strip, according to one embodiment of the present invention. A staggered top light diffusion pattern 1302 runs along the top of the light guiding strip 1102, and a staggered bottom light diffusion pattern 1304 runs along the bottom of the light guiding strip 1102. The staggered top light diffusion pattern 1302 is offset from the staggered bottom light diffusion pattern 1304, such that the light diffusion pattern is present on the top of the light guiding strip 1102 at locations where the light diffusion pattern is omitted on the bottom of the light guiding strip 1102. The staggered light diffusion pattern illustrated in FIG. 13 is one example of staggered variation on the light guiding strip 1102, and staggering of other patterns having other lengths and variations may also be used. The parts of the staggered top light diffusion pattern 1302 may also overlap parts of the staggered bottom light diffusion pattern 1304.

Figure 14:
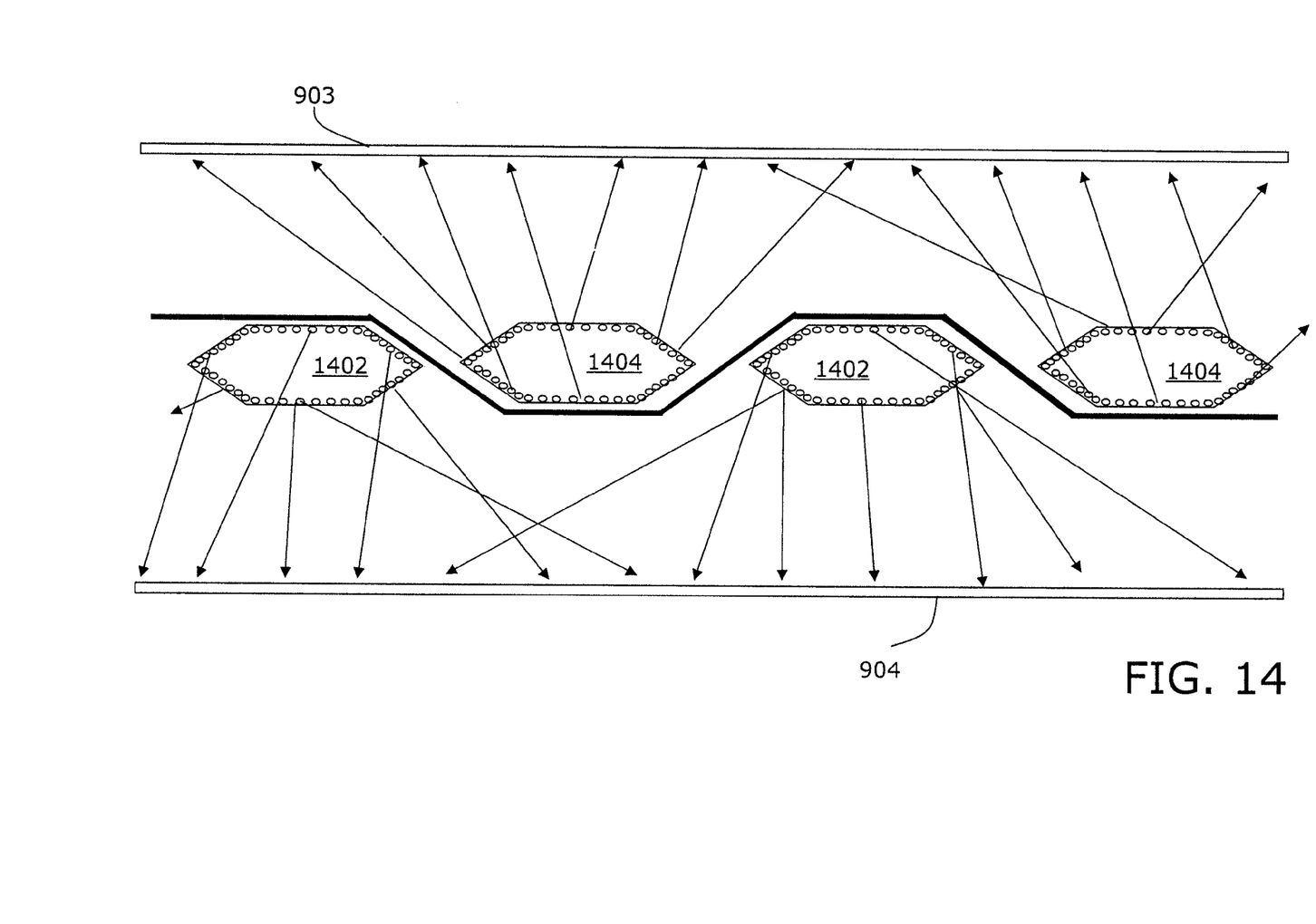
FIG. 14 is a partial, cross-sectional end view of the backlight module shown in FIG. 11, with a reflector, according to one embodiment of the present invention.

FIG. 14 is a partial, cross-sectional end view of the backlight module shown in FIG. 11, with a reflector, according to one embodiment of the present invention. The embodiment illustrated in FIG. 14 is similar to the embodiment shown in FIG. 11, having a plurality of light guiding strips 1402, 1404, the first optical layer 903, and the second optical layer 904. However, similar to the embodiment illustrated in FIG. 10, a reflector 1406 is also included thereby dividing the light guiding strips into two groups, upper light guiding strips 1402 and lower light guiding strips 1404. The description of the reflector with reference to FIG. 10 similarly applies to the embodiment illustrated in FIG. 14.

Figure 15:
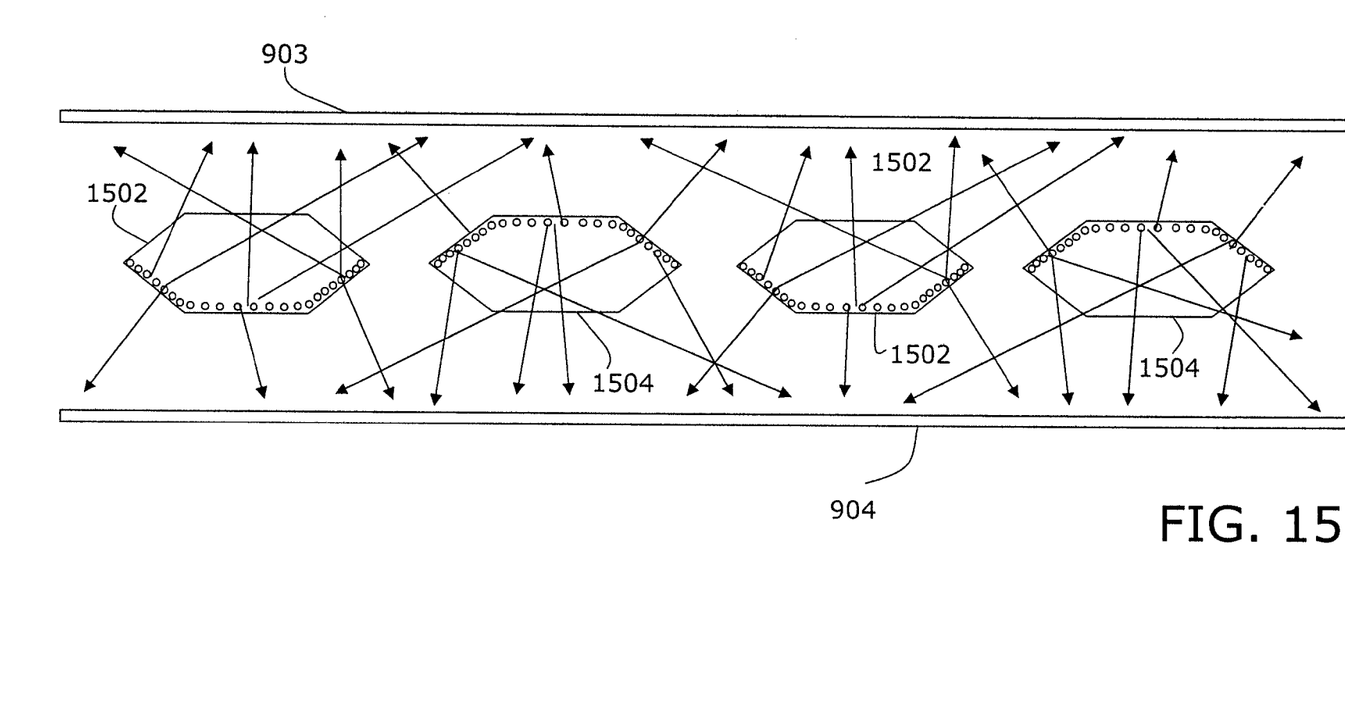
FIG. 15 is a partial, cross-sectional end view of the backlight module shown in FIG. 7, according to another embodiment of the present invention.

FIG. 15 is a partial, cross-sectional end view of the backlight module shown in FIG. 7, according to another embodiment of the present invention. Similar to the illustrated embodiment of FIG. 9, the embodiment illustrated in FIG. 15 includes a plurality of light guiding strips 1502, 1504, the first optical layer 903, and the second optical layer 904. However, the light diffusion patterns of the embodiment illustrated in FIG. 15 alternate in every other light guiding strip. Light guiding strips with light diffusion pattern on a first side form a first group of light guiding strips 1502, and light guiding strips with light diffusion pattern on a second side form a second group of light guiding strips 1504. Therefore, two adjacent light guiding strips have different light diffusion patterns. The alternating light diffusion patterns in light guiding strips generate the effect that the first group of light guiding strips 1502 emits greater light in the direction of the first optical layer 903 and the second group of light guiding strips 1504 emits greater light in the direction of the second optical layer 904. Accordingly, similar to the use of the reflector in FIGS. 10 and 14, some independence between the two different sides of the backlight module may be achieved. The light guiding strips 1502 of the first group may be independently controlled to regulate the amount of light emitted in a first direction, which is the direction of the first optical layer 903, with little or less effect on the amount of light emitted in the second direction, which is the direction of the second optical layer 904. The light guiding strips 1504 of the second group may similarly be independently controlled.

Figure 16:
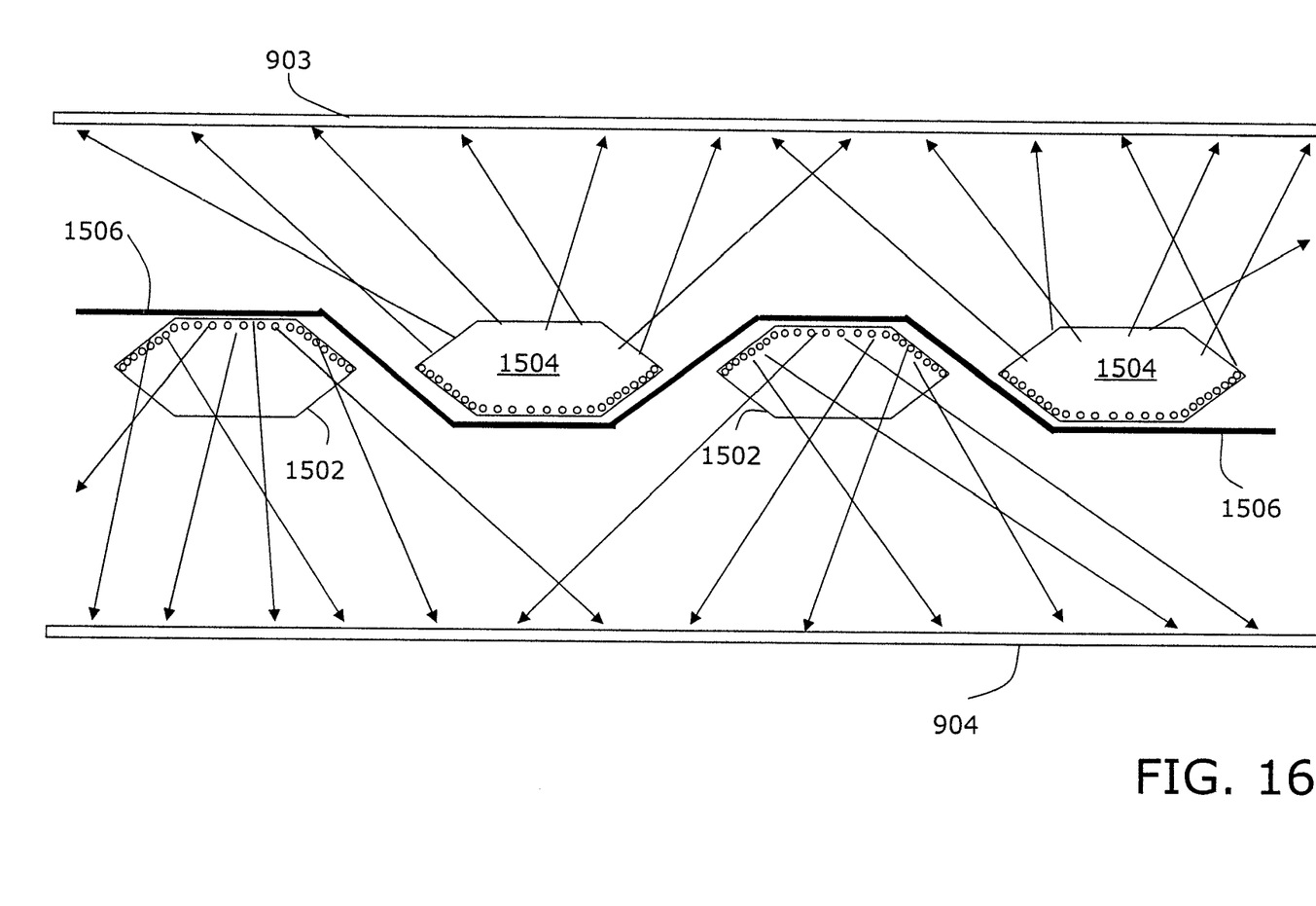
FIG. 16 is a partial, cross-sectional end view of the backlight module shown in FIG. 15, with a reflector, according to one embodiment of the present invention.

FIG. 16 is a partial, cross-sectional end view of the backlight module shown in FIG. 15, with a reflector, according to one embodiment of the present invention. The embodiment illustrated in FIG. 16 is similar to the embodiment shown in FIG. 15, having a plurality of light guiding strips 1502, 1504, the first optical layer 903, and the second optical layer 904. However, similar to the embodiment illustrated in FIG. 10, a reflector 1506 is also included thereby further increasing the independence between the light guiding strips of the first group 1502 and the light guiding strips of the second group 1504. The description of the reflector with reference to FIG. 10 similarly applies to the embodiment illustrated in FIG. 16.

While the invention has been particularly shown and described with reference to the illustrated embodiments, those skilled in the art will understand that changes in form and detail may be made without departing from the spirit and scope of the invention. For example, while certain materials were described as being used for the light guiding strip, embodiments of the present invention are not limited to these materials. Also, while embodiments of the present invention are described as being used with LED, other types of lights and light emitting devices may be used. Additionally, while certain light diffusion patterns are described, other suitable patterns may be used, and light guiding strips without any light diffusion patterns may also be used with embodiments of the present invention. Embodiments of the light apparatus are described and illustrated as having a planar arrangement. However, light guiding strips may be positioned in other arrangements such as, for example, two-plane, or three-plane arrangements where the plurality of light guiding strips are arranged into multiple groups within two or more planes.

Accordingly, the above description is intended to provide example embodiments of the present invention, and the scope of the present invention is not to be limited by the specific examples provided.

What is claimed is:

1. A double-sided planar light apparatus comprising:
a plurality of light guiding strips, wherein the plurality of light guiding strips are positioned in a planar arrangement, each of the plurality of light guiding strips including a first plurality of light emitting surfaces disposed toward a first direction and a second plurality of light emitting surfaces disposed toward a second direction, each of the plurality of light guiding strips further including a first end and a second end configured to receive light, wherein the plurality of light guiding strips are configured to emit light from the first and second plurality of light emitting surfaces.

2. The double-sided planar light apparatus of claim 1, wherein the second plurality of light emitting surfaces includes a light diffusion pattern, wherein the light diffusion pattern disrupts total internal reflection.

3. The double-sided planar light apparatus of claim 2, wherein the first plurality of light emitting surfaces includes a light diffusion pattern, wherein the light diffusion pattern disrupts total internal reflection.

4. The double-sided planar light apparatus of claim 2, wherein the light diffusion pattern includes a plurality of depressions formed on the surface of the light guiding strip.

5. The double-sided planar light apparatus of claim 2, wherein the light diffusion pattern includes a plurality of protrusions formed on the surface of the light guiding strip.

6. The double-sided planar light apparatus of claim 1, further comprising a first optical layer proximate to the plurality of light guiding strips in the first direction, and a second optical layer proximate to the plurality of light guiding strips in the second direction, wherein the plurality of light guiding strips are positioned between the first optical layer and the second optical layer.

7. The double-sided planar light apparatus of claim 6, wherein the first optical layer is a first illuminated layer and the second optical layer is a second illuminated layer.

8. The double-sided planar light apparatus of claim 6, wherein each of the plurality of light guiding strips includes a first end and a second end, and the planar light apparatus further comprises one or more frames engaging the first end of each of the plurality of light guiding strips and the second end of each of the plurality of light guiding strips, the one or more frames including one or more light sources configured to direct light into each of the light guiding strips in at least one of the first end and the second end, wherein the one or more frames is configured to position the plurality of light guiding strips between the first optical layer and the second optical layer.

9. The double-sided planar light apparatus of claim 1, wherein each of the plurality of light guiding strips includes a first end and a second end, and the planar light apparatus further comprises a plurality of LED, wherein one of the plurality of LED is disposed proximate to at least one of the first end and the second end of each of the plurality of light guiding strips.

10. A double-sided planar light apparatus comprising:
a first plurality of light guiding strips positioned in a planar arrangement, each of the plurality of light guiding strips including a first plurality of light emitting surfaces disposed toward a first direction and a second plurality of light emitting surfaces disposed toward a second direction, wherein at least one of the first plurality of light emitting surfaces of each of the first plurality of light guiding strips includes a light diffusion pattern, and wherein each of the first plurality of light guiding strips includes an end configured to receive light; and
a second plurality of light guiding strips, each of the second plurality of light guiding strips including a first plurality of light emitting surfaces disposed toward a first direction and a second plurality of light emitting surfaces disposed toward a second direction, wherein the second plurality of light guiding strips is alternately interspersed with the first plurality of light guiding strips, each of the second plurality of light guiding strips adjacent to one of the first plurality of light guiding strips, and wherein at least one of the second plurality of light emitting surfaces of each of the second plurality of light guiding strips includes a light diffusion pattern, wherein each of the first plurality of light guiding strips includes an end configured to receive light.

11. The double-sided planar light apparatus of claim 10, further comprising a plurality of reflector strips, wherein each of the first plurality of light guiding strips includes one of the plurality of reflector strips adjacent to the first plurality of light emitting surfaces, and wherein each of the second plurality of light guiding strips includes one of the plurality of reflector strips adjacent to the second plurality of light emitting surfaces, wherein each of the plurality of reflector strips is configured to overlay the adjacent surfaces of the light guiding strip.

12. The double-sided planar light apparatus of claim 10, further comprising a reflector, wherein the reflector has a corrugated configuration such that reflector is adjacent to the first plurality of light emitting surfaces of the first plurality of light guiding strips and further adjacent to the second plurality of light emitting surfaces of the second plurality of light guiding strips.

13. The double-sided planar light apparatus of claim 11, wherein the light diffusion pattern includes a plurality of depressions formed on the surface of the light guiding strip.

14. The double-sided planar light apparatus of claim 11, wherein the light diffusion pattern includes a plurality of protrusions formed on the surface of the light guiding strip.

15. The double-sided planar light apparatus of claim 11, wherein the second plurality of light emitting surfaces of the first plurality of light guiding strips includes a light diffusion pattern, and wherein the first plurality of light emitting surfaces of the second plurality of light guiding strips includes a light diffusion pattern.

16. The double-sided planar light apparatus of claim 10, wherein the light diffusion pattern disrupts total internal reflection of light in the light guiding strip.

17. The double-sided planar light apparatus of claim 10, further comprising a first optical layer proximate to the plurality of light guiding strips in the first direction, and a second optical layer proximate to the plurality of light guiding strips in the second direction, wherein the plurality of light guiding strips are positioned between the first optical layer and the second optical layer.

18. The double-sided planar light apparatus of claim 13, wherein each of the plurality of light guiding strips includes a first end and a second end, and the planar light apparatus further comprises one or more frames engaging the first end of each of the plurality of light guiding strips and the second end of each of the plurality of light guiding strips, the one or more frames including one or more light sources configured to direct light into each of the light guiding strips in at least one of the first end and the second end, wherein the one or more frames is configured to position the plurality of light guiding strips between the first optical layer and the second optical layer.

19. A double-sided planar light apparatus comprising:
   a first plurality of light guiding strips, each of the first plurality of light guiding strips including a first plurality of light emitting surfaces disposed toward a first direction and a second plurality of light emitting surfaces disposed toward a second direction, wherein at least one of the first plurality of light emitting surfaces of each of the first plurality of light guiding strips includes a light diffusion pattern, and wherein each of the first plurality of light guiding strips includes at least one end configured to receive light;
   a second plurality of light guiding strips, each of the second plurality of light guiding strips including a first plurality of light emitting surfaces disposed toward a first direction and a second plurality of light emitting surfaces disposed toward a second direction, wherein the second plurality of light guiding strips is alternately interspersed with the first plurality of light guiding strips, each of the second plurality of light guiding strips adjacent to one of the first plurality of light guiding strips, and wherein at least one of the first plurality of light emitting surfaces of each of the second plurality of light guiding strips includes a light diffusion pattern, and wherein each of the first plurality of light guiding strips includes at least one end configured to receive light;
   one or more LED positioned proximate to each of the at least one end of each of the first and second plurality of light guiding strips; and
   one or more reflectors, the one or more reflectors configured such that the reflector is adjacent to the first plurality of light emitting surfaces of the first plurality of light guiding strips and further adjacent to the second plurality of light emitting surfaces of the second plurality of light guiding strips.

* * * * *